United States Patent
Killen, Jr. et al.

(10) Patent No.: US 6,975,590 B2
(45) Date of Patent: Dec. 13, 2005

(54) FIBER-CHANNEL ARBITRATED-LOOP SPLIT LOOP OPERATION

(75) Inventors: Odie Banks Killen, Jr., Colorado Springs, CO (US); Timothy Gene Lieber, Colorado Springs, CO (US); Reuben Michael Martinez, Colorado Springs, CO (US)

(73) Assignee: Eurologic Systems Limited, Dublin (IE)

( * ) Notice: Subject to any disclaimer, the term of this patent is extended or adjusted under 35 U.S.C. 154(b) by 821 days.

(21) Appl. No.: 09/681,691

(22) Filed: May 22, 2001

(65) Prior Publication Data

US 2002/0044562 A1 Apr. 18, 2002

Related U.S. Application Data

(60) Provisional application No. 60/273,877, filed on Mar. 6, 2001.

(51) Int. Cl.[7] ............................................. G06F 11/00
(52) U.S. Cl. ...................... 370/225; 370/216; 370/222; 370/223; 370/241; 370/242; 370/250; 714/2; 714/100
(58) Field of Search ............................... 370/222, 223, 370/225, 241, 242, 250, 216; 714/2, 100

(56) References Cited

U.S. PATENT DOCUMENTS

| | | | |
|---|---|---|---|
| 5,183,749 A | 2/1993 | Ramos et al. | |
| 5,313,369 A | 5/1994 | Lewis et al. | |
| 5,483,423 A | 1/1996 | Lewis et al. | |
| 5,546,378 A * | 8/1996 | Wirth et al. | 370/223 |
| 5,790,782 A | 8/1998 | Martinez et al. | |
| 5,814,762 A | 9/1998 | Tusler et al. | |
| 5,892,973 A | 4/1999 | Martinez et al. | |
| 5,956,665 A | 9/1999 | Martinez et al. | |
| 6,000,020 A * | 12/1999 | Chin et al. | 711/162 |
| 6,050,658 A | 4/2000 | O'Sullivan et al. | |
| 6,061,244 A | 5/2000 | O'Sullivan et al. | |
| 6,101,012 A * | 8/2000 | Danagher et al. | 398/1 |
| 6,115,814 A | 9/2000 | Lieber et al. | |
| 6,188,973 B1 | 2/2001 | Martinez et al. | |
| 6,381,218 B1 * | 4/2002 | McIntyre et al. | 370/245 |
| 6,538,815 B1 * | 3/2003 | Cao | 359/484 |
| 6,631,481 B1 * | 10/2003 | Hoard et al. | 714/41 |

(Continued)

OTHER PUBLICATIONS

Xyratex—Storage Systems Home; internet webpages.

*Primary Examiner*—Wellington Chin
*Assistant Examiner*—Kevin Mew
(74) *Attorney, Agent, or Firm*—Oppedahl & Larson LLP

(57) ABSTRACT

An enclosure services processor card is arranged to selectively split a fiber-channel arbitrated-loop (FC-AL) into two split loops. The card is adapted to plug into a backplane for a rack enclosure and includes a first switch operatively connected to a hub for the FC-AL. The hub comprises a plurality of port bypass circuits, each port bypass circuit being connected to a pair of tracks which in use connect to a respective one of each of the devices comprising the fiber channel arbitrated loop. The hub further comprises a pair of switches operatively controlled by the first switch, the pair of switches being disposed between respective port bypass circuits at which the loop is to be split. In a first state the pair of switches connect the devices in a single loop and in a second state the pair of switches divide the devices into two split loops.

21 Claims, 2 Drawing Sheets

U.S. PATENT DOCUMENTS

| | | |
|---|---|---|
| 6,658,504 B1 | 12/2003 | Lieber et al. |
| 6,718,139 B1 * | 4/2004 | Finan et al. .................. 398/59 |
| 2002/0019958 A1 * | 2/2002 | Cantwell et al. |
| 2002/0105692 A1 * | 8/2002 | Lauder et al. |
| 2002/0106146 A1 * | 8/2002 | Lauder et al. |
| 2004/0076365 A1 * | 4/2004 | Ramaswami et al. |

* cited by examiner

FIBER-CHANNEL ARBITRATED-LOOP SPLIT LOOP OPERATION

This application claims the benefit of Provisional application Ser. No. 60/273,877, filed Mar. 6, 2001.

CROSS REFERENCE TO RELATED APPLICATIONS

This application relates to co-pending Irish application no. S2000/0711 filed on Sep. 7, 2000 entitled "Cross-Point Switch for a Fibre Channel Arbitrated Loop" naming Aedan Diarmid Cailean Coffey as inventor (counterpart now published as US 2002/0044561 A1); and to co-pending Irish application no. S2000/0706 filed on Sep. 7, 2000 entitled "Data Gathering Device for a Rack Enclosure" naming Aedan Diarmid Cailean Coffey et al as inventors (counterpart now published as US 2002/0054477 A1).

BACKGROUND OF INVENTION

The present invention relates to an enclosure services processor card arranged to selectively split a fibre-channel arbitrated-loop (FC-AL).

Referring now to FIG. 1, a backplane 10 suitable for being housed in a 19" 3U rack/shelf is shown schematically. For clarity, detail such as tracking or peripheral devices such as memory chips have been omitted where this detail is not necessary for describing the present invention.

The backplane further includes a pair of edge connectors (not shown), each adapted to receive one of a potential pair of plug-in enclosure services processor cards 4 (only one shown), each including a respective processor 7. The processor may, for example, operate according to the SCSI Enclosure Services (SES), SCSI Accessed Fault-Tolerant Enclosure (SAF-TE), SCSI Enclosure Services (SES) or Intelligent Platform Management Interface (IPMI) enclosure management protocols.

One or more of a range of SES Processor cards 4 can be plugged in and populated to provide advanced features, such as Ethernet, Direct Attach Fibre or Simple Network Management Protocol (SNMP). As described in related patent application entitled "Data Gathering Device for a Rack Enclosure" naming Aedan Diarmid Cailean Coffey et al as inventors (published as US 2002/0054477 A1), the two processors 7 arbitrate between one another as to which will be responsible for the provision of enclosure services.

When one processor takes responsibility, by default, the other processor goes into a "dead till enabled" standby mode. If the responsible processor for some reason fails, then the other processor will take over responsibility for environmental monitoring.

A further plurality of edge connectors (not shown) are mounted on the backplane, and a set of Fibre Channel disk drives 80 are inserted into associated slots in the rack system where they connect at their rear to respective edge connectors and are thus interconnected via the backplane. Such disks include two pairs of fibre channel ports, each pair connecting to a respective one of a pair of Fibre Channel-Arbitrated Loops (FC-AL) designated Loop A and Loop B. Each disk further includes an Enclosure Services Interface (ESI) port (also more properly known as SFF-8067. SFF=Small Form Factor). This is conventionally used to provide communication between one or more of the disks and an enclosure services processor located on either a card connected to the backplane or even incorporated on the backplane.

A host application running on one or both of host machines Host A or Host B communicates with each of the disks 80 via one of the fibre channel loops. When the host application wishes to send and receive enclosure services information, for example, using the SES protocol, it sends a request to a pre-determined one of the disks. When the receiving disk processes the request, it determines that the request is an enclosure services request and forwards this request through its ESI port. Alternatively, the SES processor can report status to and receives commands from the host application out-of-band via an RS-232 connection (not shown).

In any case, for each disk 80, each of the sending and receiving ports for loop A and loop B are brought onto a respective processor card 4 where they connect to a hub 6. Conventionally, the hub comprises a plurality of port bypass circuits (PBC) each employed to connect a respective disk in a loop and to bypass ports where no disk is inserted in the slot. These circuits enable the fibre channel arbitrated loop (FC-AL) to be opened and closed and thereby dynamically reconfigured if a device is added or removed to the FC-AL. The PBC comprises a 2-input multiplexer and a switch connecting either one of the inputs to the output. The PBCs are connected in sequence such that the output of each PBC acts as one of the inputs for the next PBC. The loop is completed by connecting the output of the last device in the loop, in this case the Host A to one of the inputs of the first PBC ($PBC_1$).

For example, looking at hub port $PBC_2$, it can be seen that the output of the preceding hub port, namely $PBC_1$, is transmitted both to hub port $PBC_2$ and to the input of Disk 2. The response from Disk 2 is transmitted back through the hub port $PBC_2$. In use, if a hub port (in this case $PBC_2$), detects that a device is connected to it, then the PBC directly connects the response signal from the attached device to the PBC output. For clarity, the detection circuitry is not shown for all circuits, however, in each case the output signal from a device whose presence is being tested is detected.

If however, a hub port detects that a device is not connected to it, or is not responding, it directly connects the input from the preceding PBC to its own output. This acts to close the associated PBC and bypass the hub port thereby allowing the loop to remain intact. This prevents a failing device or connection from bringing down the entire loop.

If it is desired to add a new device, at port $PBC_1$ for example, the loop opens automatically to add the new device without manual intervention, by toggling the position of the corresponding PBC switch. By this, the hub allows hot plugging; the ability to add and remove devices while the loop is active. In future versions of FC-AL, before a new device is allowed to be inserted in the loop, the hub will, at a minimum, verify valid signal quality. If a device exhibits poor signal quality or inappropriate clock speed, the associated PBC switch will remain toggled to bypass the hub-port, thereby allowing the other nodes on the loop to continue without disruption.

Arbitrated loop hubs may provide from 1 to 16 hub ports, i. e. n=16, with accommodation for more devices accomplished by cascading hubs together. A cascade is built by simply connecting a hub port, in this case $PBC_{EX}$ of one hub to a hub port on the other, preferably with fibre optic cabling. Alternatively, a second host, in this case Host B, can be connected to the hub port, thereby providing redundancy (hot-standby) for Host A or load-sharing access to the loop devices. In any case, the total loop circumference is extended through additional hubs until the desired port count is reached.

However, such hubs have the disadvantage that the sequence of ports in the FC-AL through which a signal is transmitted is fixed by the internal wiring of the hub. Further such systems only allow the connection of one port to another thereby acting to include devices in the FC-AL.

In co-pending application entitled "Cross-Point Switch for a Fibre Channel Arbitrated Loop" naming Aedan Diarmid Cailean Coffey as inventor the hub 6 comprises a cross-point switch which is used to connect each of the disk sending ports to a receiving port of another disk in one of Loops A or B in a configurable manner. Thus, disks (or repeaters or retimers if necessary) may be ordered in either loop in any desirable manner and furthermore, or they may be spaced apart in the loop in a manner that smoothes the signal level throughout the loop.

In order to configure the cross-point switches, the processor responsible for the shelf needs to determine which disks are present. The processor then determines the switches that are to be closed to link each of the disks 80 in whichever of Loops A and B are connected to its hub and relays this information to the cross-point switches.

It will be seen, however, that with all devices on the same loop, the overall throughput of the host applications connected to the loop is limited to the bandwidth of the loop. Thus, even if one or more host applications are accessing the devices on Loop A while other host applications are accessing the devices on Loop B, the maximum data rate is still limited by the bandwidth of the loop.

SUMMARY OF INVENTION

The present invention provides an enclosure services processor card arranged to selectively split a fibre-channel arbitrated-loop (FC-AL) into two split loops, said card being adapted to plug into a backplane for a rack enclosure and including a first switch operatively connected to a hub for said FC-AL, said hub comprising a plurality of port bypass circuits, each port bypass circuit being connected to a pair of tracks which in use connect to a respective one of each of said devices comprising said fibre channel arbitrated loop, said hub further comprising a pair of switches operatively controlled by said first switch, said pair of switches being disposed between respective port bypass circuits at which said loop is to be split so that in a first state said pair of switches connect said devices in a single loop and in a second state said pair of switches divide said devices into two split loops.

BRIEF DESCRIPTION OF DRAWINGS

Embodiments of the invention will now be described, by way of example, with reference to the accompanying drawings, in which.

DETAILED DESCRIPTION

Figure 1:
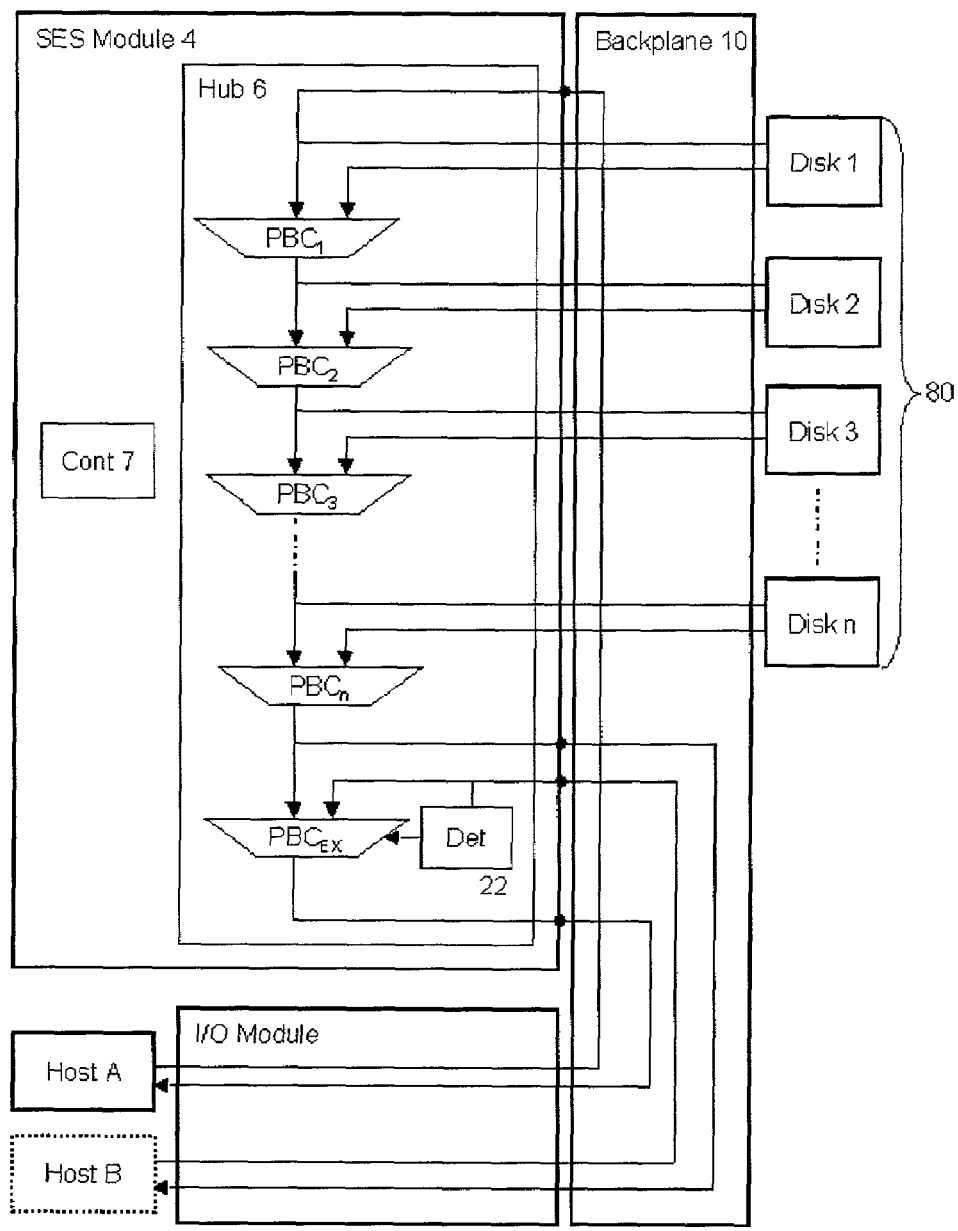
FIG. 1 is a schematic diagram of a enclosure services processor card including a conventional hub mechanism.
Figure 2:
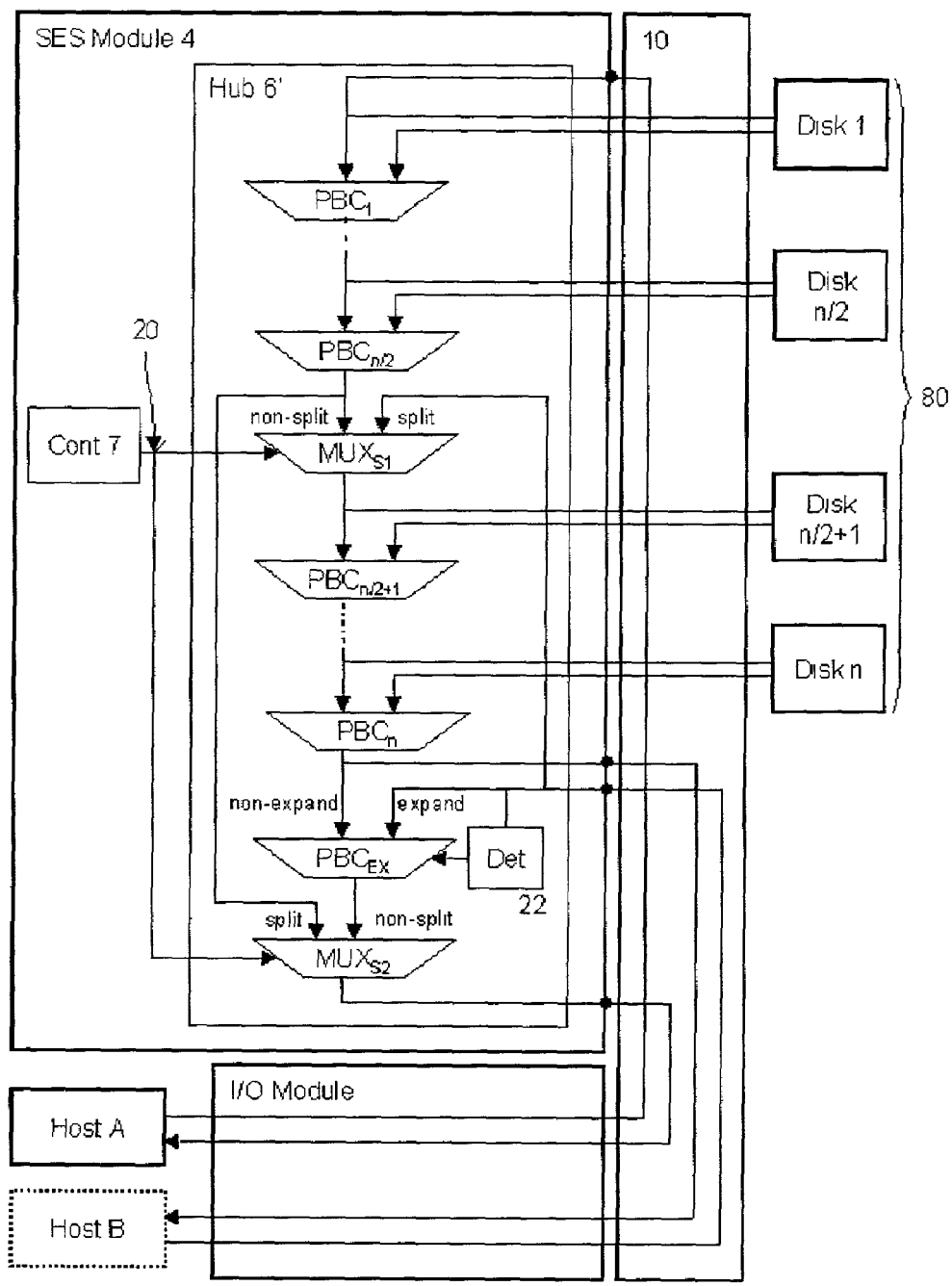
FIG. 2 is a schematic diagram of an enclosure services processor card according to a preferred embodiment of the invention.

Referring now to FIG. 2, in a preferred embodiment, FIG. 2, a hub 6" of the type including port bypass circuits includes two additional switches or multiplexers $MUX_{S1}$ and $MUX_{S2}$ under the control of a switch 20 whose state is in turn controlled by the SES processor 7.

In this case, it should be noted that because the loop is to be split, it is important that whenever one SES processor fails, the other processor can receive SES requests sent to at least one of the disks on its loop. This is a particularly important consideration when the loop may have been split into two loops prior to an SES processor card failure and may then need to be re-joined to allow access to the devices on a single loop via the hub on the other SES processor card.

In the preferred embodiment, Disks 1 to n are connectable to the backplane and the SES processor 7 is configurable to selectively split its associated loop by actuating the multiplexers accordingly. This causes the loop to be split into two loops comprising Disk 1 to Disk n/2; and Disk n/2+1 to Disk n respectively. Thus, $MUX_{S1}$ is disposed between the output of $PBC_{n/2}$ and the input of $PBC_{n/2+1}$. The second input of $MUX_{S1}$ is connected to the return signal from the expansion port to which in this case Host B is connected. $MUX_{S2}$ is disposed between the output of $PBC_{EX}$ and the input of Host A. The second input of $MUX_{S2}$ is connected to the output signal from $PBC_{n/2}$. The remaining connections are as before.

Under normal non-split non-expanded loop operation the path around the loop comprises whichever are present of Disk 1 . . . Disk n/2, through $MUX_{S1}$ non-split input to whichever are present of Disk n/2+1. . . Disk n, through $PBC_{EX}$ non-expanded input, through $MUX_{S2}$ non-split input, through to Host A and back to Disk 1. It should be seen that when in this mode, as the output from $PBC_{n/2}$ is connected to the split input of $MUX_{S2}$, it can be regarded as open circuited.

The only difference between this and normal non-split expanded loop operation is that $PBC_{EX}$ switches to its expanded input under the control of the detection circuitry 22, to allow in this case, Host B, to enter the loop between Disk n and Host A.

In split loop operation, the path around the first loop comprises whichever are present of Disk 1 . . . Disk n/2, through $MUX_{S2}$ split input through to Host A and back to Disk 1. It should be seen that when in this mode, as the output from $PBC_{n/2}$ is connected to the non-split input of $MUX_{S1}$, it can be regarded as open circuited.

The path around the second loop comprises whichever are present of Disk n/2+1 . . . Disk n, probably through $PBC_{EX}$ expanded input to include Host B and through $MUX_{S1}$ split input to go back to Disk n/2+1. Again, it should be seen that when in this mode, as the output from $PBC_{EX}$ is connected to the non-split input of $MUX_{S2}$, it can be regarded as open circuited.

It can therefore be seen that, if for example, the loop shown is Loop A and this is split, Host A can access Disk 1 to Disk n/2 on this loop and Host B can access Disk n/2+1 to Disk n on this same loop. However, maximum bandwidth is available to both hosts and so potentially double the transfer rate is available for the shelf.

If on Loop B, the hosts are added to the opposite split loop, i. e. Host A accessing Disk n/2+1 to Disk n and Host B accessing Disk 1 to Disk n/2, then the throughput of the shelf can be almost doubled without any loss of access from the hosts to the disks.

Alternatively, up to four hosts can connect to respective split loops on each of Loop A and Loop B to potentially quadruple the throughput to disks vis-à-vis single host access.

Nonetheless, should a single host fail or should an enclosure services processor card fail, then the responsible SES processor can independently and automatically re-join the loops. Alternatively, any hosts that remain can instruct the SES processor via any disks it remains in contact with (or alternatively out-of-band) to re-join the loops.

It will be seen that the preferred embodiment has been described in terms of a SES processor 7 controlling the switch, which in turn controls the splitting of loop operation. Nonetheless, the invention could equally well be implemented by including a jumper on the SES processor card 4, with the jumper being open or closed to control the state of the switches joining or splitting the loop.

It will also be seen that with the addition of further switches such as $MUX_{S1}$ and $MUX_{S2}$ to the hub, the loop can be split into even more split loops as required.

What is claimed is:

1. An enclosure services processor card arranged to selectively split a fibre-channel arbitrated-loop (FC-AL) of devices into two split loops,
    said card being adapted to plug into a backplane for a rack enclosure and including a first switch operatively connected to a hub for said FC-AL,
    said hub comprising a plurality of port bypass circuits,
    each port bypass circuit being connected to a pair of tracks which in use connect to a respective one of each of said devices comprising said fibre channel arbitrated loop,
    said hub further comprising second and third switches operatively controlled by said first switch,
    said second and third switches being disposed between respective port bypass circuits at which said loop is to be split so that in a first state said second and third switches connect said devices in a single loop and in a second state said second and third switches divide said devices into two split loops,
    said single loop of the first state having a first bandwidth,
    said two split loops of the second state having a second bandwidth, said second bandwidth being twice that of the first bandwidth.

2. An enclosure services card as claimed in claim 1 wherein said card includes an enclosure services processor operatively connected to said first switch, said enclosure services processor being operable to selectively control said first switch to split said fibre-channel devices into two split loops.

3. An enclosure services card as claimed in claim 1 wherein said first switch comprises a jumper, said jumper being configurable to selectively split said fibre-channel devices into two split loops.

4. An enclosure services processor card arranged to selectively split a fibre-channel arbitrated-loop (FC-AL) of devices into two split loops,
    said card being adapted to plug into a backplane for a rack enclosure and including a first switch operatively connected to a hub for said FC-AL,
    said hub comprising a plurality of port bypass circuits,
    each port bypass circuit being connected to a pair of tracks which in use connect to a respective one of each of said devices comprising said fibre channel arbitrated loop,
    said hub further comprising second and third switches operatively controlled by said first switch,
    said second and third switches being disposed between respective port bypass circuits at which said loop is to be spilt so that in a first state said second and third switches connect said devices in a single loop and in a second state said second and third switches divide said devices into two split loops,
    wherein said hub further comprises a further port bypass circuit being connected to a pair of tracks which in use connect to an expansion port through which a further one or more devices can be connected to said loop.

5. An enclosure services card as claimed in claim 4 wherein said hub further comprises a pair of tracks connected between a pair of port bypass circuits and which in use connect to a host device.

6. An enclosure services card as claimed in claim 5 wherein said pair of tracks are arranged to locate said host device in a first split loop and said further port bypass circuit is arranged to locate said expansion port in a second split loop.

7. A rack enclosure comprising a processor card as claimed in claim 1, a backplane and a plurality of devices connected to said backplane forming one or more fibre channel arbitrated loops.

8. An enclosure services card as claimed in claim 1 wherein said hub further comprises a further port bypass circuit being connected to a pair of tracks which in use connect to an expansion port through which a further one or more devices can be connected to said loop.

9. An enclosure services card as claimed in claim 8 wherein said hub further comprises a pair of tracks connected between a pair of port bypass circuits and which in use connect to a host device.

10. An enclosure services card as claimed in claim 9 wherein said pair of tracks are arranged to locate said host device in a first split loop and said further port bypass circuit is arranged to locate said expansion port in a second split loop.

11. An enclosure services processor card arranged to selectively split a fibre-channel arbitrated-loop (FC-AL) of devices into two split loops,
    said card being adapted to plug into a backplane for a rack enclosure and including a first switch operatively connected to a hub for said FC-AL,
    said hub comprising a plurality of port bypass circuits,
    each port bypass circuit being connected to a pair of tracks which in use connect to a respective one of each of said devices comprising said fibre channel arbitrated loop,
    said hub further comprising second and third switches operatively controlled by said first switch,
    said second and third switches being disposed between respective port bypass circuits at which said loop is to be split so that in a first state said second and third switches connect said devices in a single loop and in a second state said second and third switches divide said devices into two split loops,
    whereby dividing said devices into two split loops gives rise to a bandwidth double that of the devices connected in single loop.

12. An enclosure services card as claimed in claim 11 wherein said card includes an enclosure services processor operatively connected to said first switch, said enclosure services processor being operable to selectively control said first switch to split said fibre-channel devices into two split loops.

13. An enclosure services card as claimed in claim 11 wherein said first switch comprises a jumper, said jumper being configurable to selectively split said fibre-channel devices into two split loops.

14. A rack enclosure comprising a processor card as claimed in claim 11, a backplane and a plurality of devices connected to said backplane forming one or more fibre channel arbitrated loops.

15. An enclosure services card as claimed in claim 11 wherein said hub further comprises a further port bypass circuit being connected to a pair of tracks which in use connect to an expansion port through which a further one or more devices can be connected to said loop.

16. An enclosure services card as claimed in claim 15 wherein said hub further comprises a pair of tracks connected between a pair of port bypass circuits and which in use connect to a host device.

17. An enclosure services card as claimed in claim 16 wherein said pair of tracks are arranged to locate said host device in a first split loop and said further port bypass circuit is arranged to locate said expansion port in a second split loop.

18. A method for use with an enclosure services processor card arranged to selectively split a fibre-channel arbitrated-loop (FC-AL) of devices into two split loops, said card being adapted to plug into a backplane for a rack enclosure and including a first switch operatively connected to a hub for said FC-AL, said hub comprising a plurality of port bypass circuits, each port bypass circuit being connected to a pair of tracks which in use connect to a respective one of each of said devices comprising said fibre channel arbitrated loop, said hub further comprising second and third switches operatively controlled by said first switch, said second and third switches being disposed between respective port bypass circuits at which said loop is to be split so that in a first state said second and third switches connect said devices in a single loop and in a second state said second and third switches divide said devices into two split loops, the method comprising the step of:

flipping said first switch from a first position to a second position, the operation of which causes each of said second and said third switches to flip from a first position to a second position, thereby dividing said devices into two split loops, said two split loops together having twice the bandwidth of said devices connected in a single loop.

19. The method of claim 18 further comprising the step of:

flipping said first switch from said second position to said first position, the operation of which causes each of said second and said third switches to flip from said second position to said first position, thereby connecting said devices into a single loop, said single loop having one-half the bandwidth of said devices divided into two split loops.

20. A method for use with an enclosure services processor card arranged to selectively split a fibre-channel arbitrated-loop (FC-AL) of devices into two split loops, said card being adapted to plug into a backplane for a rack enclosure and including a first switch operatively connected to a hub for said FC-AL, said hub comprising a plurality of port bypass circuits, each port bypass circuit being connected to a pair of tracks which in use connect to a respective one of each of said devices comprising said fibre channel arbitrated loop, said hub further comprising second and third switches operatively controlled by said first switch, said second and third switches being disposed between respective port bypass circuits at which said loop is to be split so that in a first state said second and third switches connect said devices in a single loop and in a second state said second and third switches divide said devices into two split loops, the method comprising the step of:

flipping said first switch from a second position to a first position, the operation of which causes each of said second and said third switches to flip from a second position to a first position, thereby connecting said devices into a single loop, said single loop having one-half the bandwidth of said devices divided into two split loops.

21. The method of claim 20 further comprising the step of:

flipping said first switch from said first position to said second position, the operation of which causes each of said second and said third switches to flip from said first position to said second position, thereby dividing said devices into two split loops, said two split loops together having twice the bandwidth of said devices connected in a single loop.

* * * * *